United States Patent [19]
Chan

[11] Patent Number: 5,651,078
[45] Date of Patent: Jul. 22, 1997

[54] METHOD AND APPARATUS FOR REDUCING CONTOURING IN VIDEO COMPRESSION

[75] Inventor: Ming Hong Chan, Los Angeles, Calif.

[73] Assignee: Thomson Consumer Electronics, Inc., Indianapolis, Ind.

[21] Appl. No.: 276,281

[22] Filed: Jul. 18, 1994

[51] Int. Cl.⁶ .................................................. G06K 9/36
[52] U.S. Cl. ........................................ 382/261; 382/274
[58] Field of Search .............................. 382/232, 260, 382/261, 263, 266, 274, 275; 348/241, 252, 470, 608; 358/454, 463; H04N 5/21

[56] References Cited

U.S. PATENT DOCUMENTS

| | | | |
|---|---|---|---|
| 4,613,986 | 9/1986 | Ataman et al. | 382/54 |
| 4,677,479 | 6/1987 | Hattori et al. | 358/135 |
| 5,134,667 | 7/1992 | Suzuki | 382/22 |
| 5,224,177 | 6/1993 | Doi et al. | 382/54 |
| 5,224,178 | 6/1993 | Madden et al. | 382/50 |
| 5,245,428 | 9/1993 | De With et al. | 358/133 |
| 5,388,168 | 2/1995 | Sakashita et al. | 382/54 |
| 5,392,365 | 2/1995 | Steinkirchner | 382/22 |
| 5,416,606 | 5/1995 | Katayama et al. | 358/467 |

*Primary Examiner*—Andrew Johns
*Attorney, Agent, or Firm*—Joseph S. Tripoli; Eric P. Herrmann; Ronald H. Kurdyla

[57] ABSTRACT

An encoding method and apparatus for conditioning video signal to reduce contouring in images reproduced from compressed video signal involves preconditioning the video signal, prior to completion of compression, to effectively amplify noise in portions of the video signal representing relatively smooth image areas. In an exemplary embodiment, a memory is programmed at respective address locations to remap amplitude values of a digitized signal applied as addresses to the memory. The programming is arranged to enlarge a range of lower amplitude values, and to effectively pass higher amplitude values unaltered.

16 Claims, 5 Drawing Sheets

METHOD AND APPARATUS FOR REDUCING CONTOURING IN VIDEO COMPRESSION

This invention relates to video processors and in particular to a method and apparatus for reducing image contouring in flat field image areas reproduced from data compressed via lossy processes.

BACKGROUND OF THE INVENTION

In order to transmit video data more efficiently than by use of analog techniques, various forms of digital video signal compression systems have been proposed. The majority of these systems process sampled video signals on a block by block basis wherein a block includes a matrix of 8 pixels in each of 8 lines. A particular one of these systems is evolving into a standard which is known as "MPEG". Most current video signal compression processes tend to be lossy, that is, images reproduced from lossy compressed data represent less than the original.

One of the problems exhibited by reproduced video images, such as in the MPEG1 OR MPEG2 processes, is the visibility of contours in relatively flat field (smooth) dark images. That is, in darker flat field images, separate regions of different intensity which are separated by well defined contours are perceived. These contours are manifested by distinctive image intensity steps. The intensity differences between neighboring contoured regions may be small, however, the contours may be highly visible and highly objectionable under certain viewing conditions. Under normal viewing conditions, the contouring tends not to be perceptible. However, in low ambient light conditions (e.g., when viewing television in a darkened room) or when the image is reproduced with high contrast/brightness adjustments, the contouring is highly visible.

A similar contouring is exhibited by images which are reproduced by simple analog-to-digital-to-analog conversion when the conversion process is performed with insufficient quantizing resolution. If an image is quantized with, for example, eight bits, no contouring is apparent in reproduced images. However, if a video signal is quantized with eight bits and then compressed via a lossy process, and subsequently decompressed and reproduced, contouring will be apparent in darker flat field images.

The present inventor has determined that the main reason contouring is not perceived in the original digitized source image is due to the existence of dithering noise. Consider an analog video signal which is represented by a slowly changing ramp function traversing the values from n−1 to n+1. Respective consecutive values are captured and digitized. If the sampling instants occurred exactly at the instants the ramp exhibited the values n−1, n, n+1, the resulting signal would produce a contoured image. However, the sampling instants normally occur at instants the signal is between values, and probabilisticly, the conversion process may produce either of the values creating a signal representing "gray" areas. These gray areas tend to exhibit a low level noise, but this noise blurs or smoothes any contouring effects. Similarly, if the original signal contains random noise, the noise will provide low level interference of the conversion process, which will also produce a signal that tends to blur or smooth contours.

In image areas where the dithering noise plays a role in preventing contouring, any processing in between the video signal source and the signal destination, which intentionally or unintentionally cleans up or reduces the noise, will result in a degree of unintentional contouring. This may happen in a video encoder (compressor) as a result of bit-rate control. For example, in an MPEG encoder, blocks representing relatively smooth areas may be forced to a condition of all zero valued AC coefficient residues (the so called "no-code" condition), or the compression quantization may result in all zero valued AC coefficient residues. In addition, small deviations of the DC coefficient residues may be removed by compression quantizing, which deviations would otherwise tend to blur or smooth contours in reproduced images.

MPEG encoding is performed using a limited dynamic range. A clamping condition occurs if the values of quantized coefficients exceeds the dynamic range, which clamping results in highly undesirable visual artifacts. MPEG implementations generally check for a clamping condition, and on the occurrence of such, restart the quantization process with coarser quantization parameters, in an iterative manner, until the clamping condition has been eliminated. The coarser quantization parameters utilized to cure clamping removes much if not all dithering noise effects, giving rise to blockiness and contouring.

SUMMARY OF THE INVENTION

The present invention is an encoding method and apparatus for conditioning video signal to reduce contouring in images reproduced from compressed video signal. The method involves preconditioning the video signal, prior to completion of compression, to effectively amplify noise in portions of the video signal representing relatively smooth image areas. In one exemplary embodiment, a memory is programmed at respective address locations to remap amplitude values of a digitized signal applied as addresses to the memory. The programming is arranged to enlarge a range of lower amplitude values, and to effectively pass higher amplitude values unaltered.

BRIEF DESCRIPTION OF THE DRAWINGS

The invention will be described with reference to the drawings wherein.

DETAILED DESCRIPTION

Figure 1:
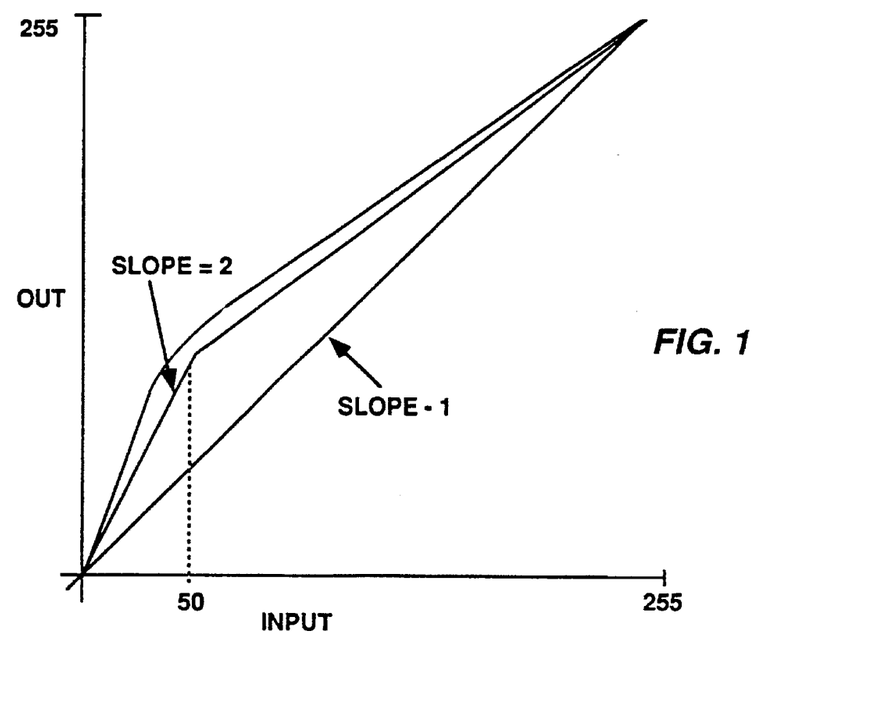
FIGS. 1, 2, 9 and 12 are graphs illustrating alternative amplitude remapping functions embodying the invention.

FIG. 1 illustrates the general form of the video signal amplitude remapping function that will significantly reduce contouring of lossy compressed video signal. This remapping is performed during pre compression processes and may be executed in either the analog or digital signal processing domain. The transfer function illustrated reduces contouring in relatively dark image areas, but contour reduction may also be performed on brighter, flat field image areas.

In the relatively darker image portions, contouring is reduced by enhancing low level noise. This is effected by expanding or amplifying a limited range of lower amplitude signal. In FIG. 1, the straight 45 degree line represents an identity mapping which will produce the original or source video signal unaltered. The piece-wise linear line illustrates the pre compression preconditioning function. It will be noted that signal values representing relatively dark images are amplified by a larger gain factor than signal values representing relatively bright images. Preferably there will be little or no gain or offset applied to the brighter image signals.

It has been found in the particular compression apparatus utilized by the inventor, which has a signal dynamic range of 0–255 values, that the source signal should be amplified over a range which extends from about 20 to about 50. Including the range from zero to 20 creates little if any perceptible change.

The slope of the high gain portion of the piece-wise linear transfer function is depicted as providing a gain of two, however different systems will respond differently to different gain factors. The optimum slope or gain is a function of the system algorithm for applying, and the coarseness of the compression coefficient quantization. Thus the optimum slope for respective systems is to be determined by measurement.

The smooth curve in FIG. 1 illustrates an alternative contour reducing or remapping transfer function.

Figure 2:
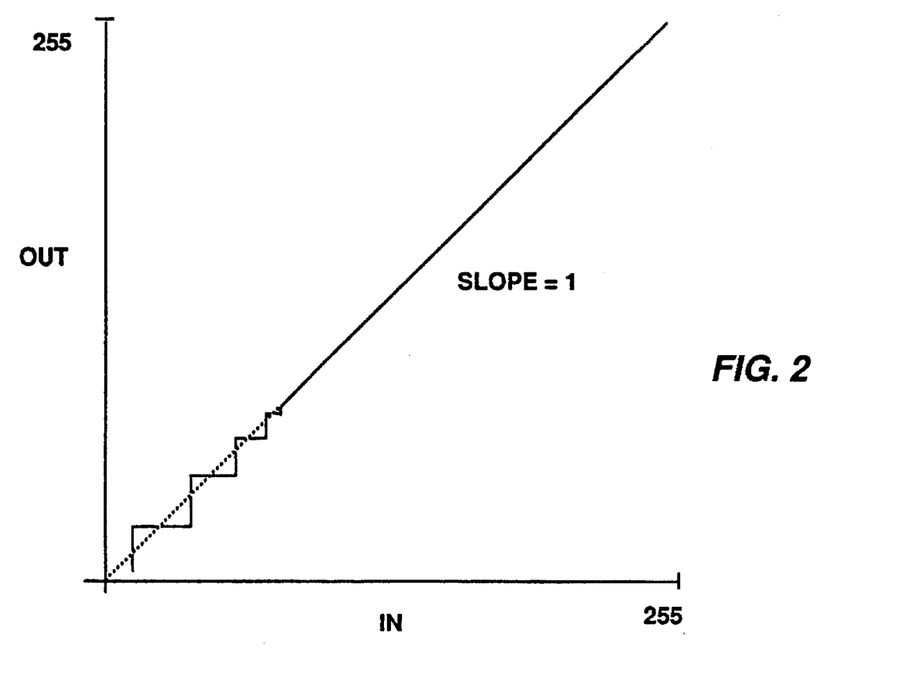

FIG. 2 illustrates a second class of remapping which has no affect on the overall brightness of images. It replaces darker image values with stair step incremental values having an average slope of one. This transfer function tends to merge some image regions while amplifying dithering noise between other regions. Use of this transfer function tends to reduce the amplitude resolution of darker images, but it also enhances signal variations over some ranges of input signal. The overall effect of this form of amplitude mapping is less visible contours in reproduced images. This latter function has the further advantage that it is relatively simple to implement.

Figure 3:
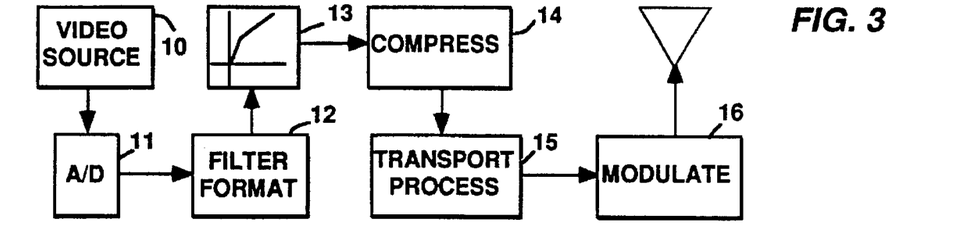
FIG. 3 is a block diagram of video signal encoder including a signal amplitude remapper embodying the invention.

FIG. 3 illustrates a video signal compression/encoder of the motion compensated predictive type such as for providing signal according to the MPEG protocol. In FIG. 3 analog video signal is provided by a source 10, which may be a video camera, recorder, etc. The video signal is applied to an analog to digital (A/D) converter 11 which generates a sampled, binary representation of the analog signal. The binary or digital video signal is applied to a filter/formatter 12 which conditions the video signal for compression. Filter/formatter 12 may include apparatus to antialias filter and subsample the video signal, combine fields into frames, and resequence frames within successive groups of frames as required by the MPEG protocol.

Signal provided by the filter formatter 12 is applied to the amplitude remapper 13 which expands or amplifies the low amplitude samples. Samples output from the remapper 13 are compressed in a motion compensated predictive compressor 14, which performs compression on blocks of pixel values. Element 14 may provide compressed video signal according to the MPEG1 or MPEG2 video standards, for example. The compressed video signal is coupled to a transport processor 15 wherein it is segmented and concatenated with headers to form packets of signal for transmission. This packetization enhances the overall survivability of the transmitted signal. Transport packets are applied to a modulator 16 for transmission. Error coding and/or signal shuffling may be included in either the transport processor 15 or the modulator 16.

The remapper 13 is illustrated as following the filter/formatter 12, however the function may be executed either directly before or directly after the A/D 11.

Figure 4:
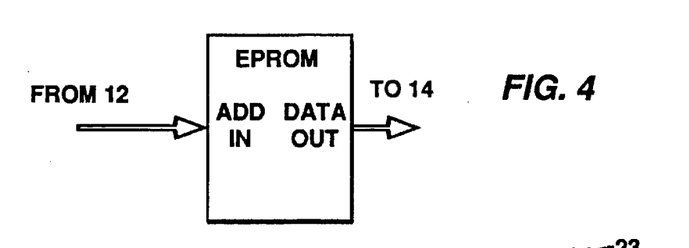
FIG. 4, 5, 6, 7, 8, 10 and 11 are schematic diagrams of alternative remapping apparatus embodying the invention.

FIG. 4 illustrates a first exemplary embodiment of the remapper 13 in the most general form. This embodiment is a read only memory (ROM) which may be programmed at respective address locations to generate any of the transfer functions shown in FIGS. 1 or 2. This is accomplished by programming address locations (values on the abscissa of FIGS. 1 and 2) with values of the represented transfer function reflected on the ordinate of FIGS. 1 and 2. In operation the video signal (applied from either the A/D 11 or the filter/formatter 12) is coupled to the address input port of the ROM, and transformed or amplitude remapped video signal is accessed at the ROM output port.

Figure 5:
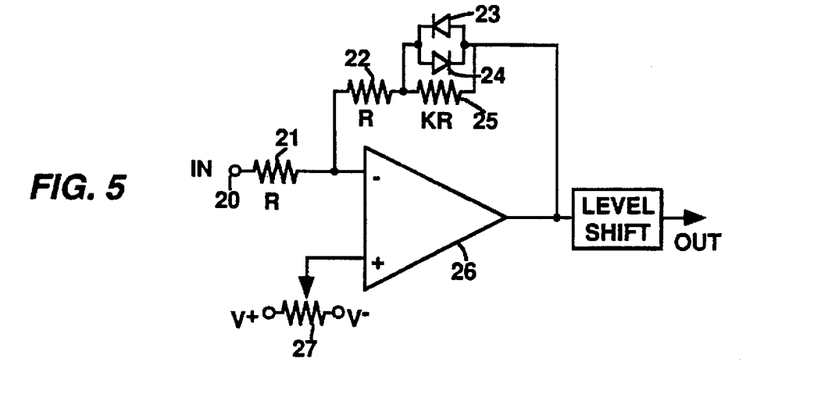

FIG. 5 illustrates an analog amplitude remapper which provides a transfer function similar to the smooth curve illustrated in FIG. 1. FIG. 5 includes an operational amplifier 26 with degenerative feedback including resistors 22 and 25 coupled in series between the inverting input and the output terminals of amplifier 26. Oppositely poled diodes 23 and 24 are coupled in parallel with resistor 25. Video signal from source terminal 20 is applied to the inverting input terminal via a resistor 21. An adjustable DC voltage is applied to the non-inverting input terminal of the amplifier 26. Assume that resistors 21, 22 and 25 have values R, R and KR respectively, where K is a constant. For input signal having amplitudes less than the forward breakdown voltage of the diodes divided by (1+K), the gain at the output of the amplifier 26 is (1+K). For larger input signal the gain becomes substantially equal to one because one of the diodes 23 or 24 will conduct and short resistor 25. The inclusion of a forward conducting diode raises the DC value of the output signal hence a level shifter 28 is connected in series with the amplifier 26 to compensate for such increase in DC value. Note that by adjusting the DC value applied to the non-inverting input terminal this circuit arrangement may be conditioned to effect a gain increase at different input amplitudes over a limited range. For example, if it is determined that video signal of an average amplitude value of V represents a flat field image area, the DC potential applied to the non-inverting input terminal may be adjusted to accommodate this range.

Figure 6:
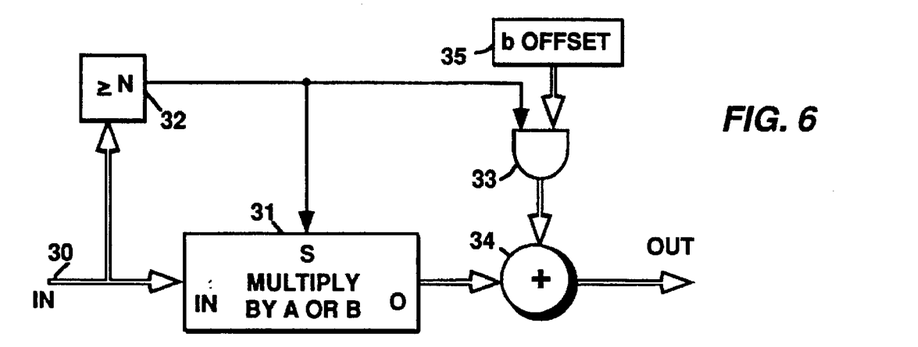

FIG. 6 illustrates an exemplary digital embodiment which executes a piece-wise linear remapping function. In FIG. 6, a digital representation of the video signal is applied, via terminal 30, to a digital multiplier 31 and a threshold detector 32. The multiplier 31 has two selectable multiplication factors A and B with A>B. For input video signal values less than and greater than a predetermined value "N", the multiplier performs multiplication by factors A and B respectively. The value N is the input signal breakpoint value of the piece-wise linear remapping function. Switching between gain factors A and B is executed by the threshold detector 32, which produces a gain change control signal when the input signal crosses value N.

In order to preclude a DC discontinuity at instances of gain change, a DC value, b, is added to the multiplied output when gain factor B is employed. The DC value is provided by a source 35 and is selectively coupled to an adder 34 by an AND gate 33, which is selectively enabled by the threshold detector 32. The multiplied video signal is applied to a second input of the adder 34, which adder provides the remapped signal. This feature presumes that the remapping function Vid.out is equal to:

$$Vid.out = A\ Vid.in \quad \text{for} \quad Vid.in < N$$
$$Vid.out = B\ Vid.in + b \quad \quad Vid.in \geq N$$

A gain factor B may be selected equal to (255-AN)/(255-N) to effect substantially no DC or brightness change for brighter image areas. In this instance b will be established at a value $$b = \frac{255(N)(A-1)}{(255-N)}$$

assuming 8-bit digital video samples and Vid.out equal to Vid.in at an input value of 255.

Figure 7:
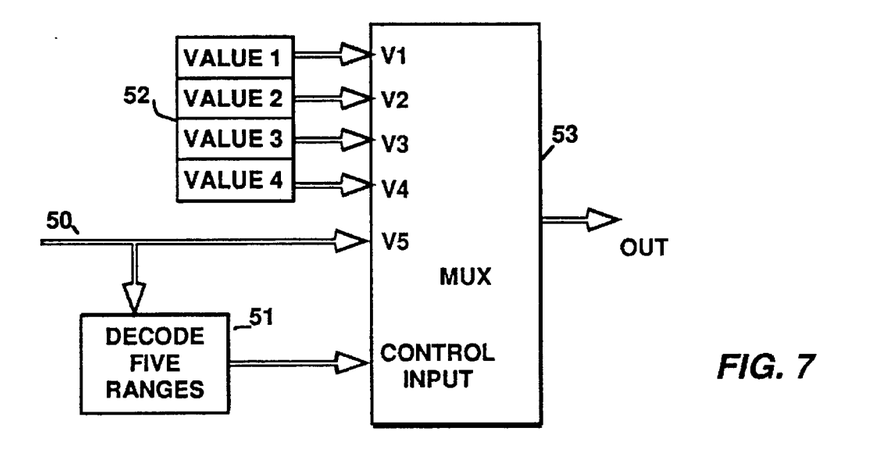

FIG. 7 illustrates a further exemplary embodiment for implementing the function illustrated in FIG. 2. In FIG. 7 video signal is applied to one input (V5) of a multiplexor 53 and an input of a decoder 51. Four constant values (Value 1 to Value 4) from a source 52 are coupled to respective other input terminals (V1–V4) of the multiplexor 53. A control signal from the decoder 51 is applied to a control input of the multiplexor 53 to selectively pass one of the signals available at input terminals V1–V5.

The decoder 51 is designed to provide five output states for selecting one of the five signals. Each output state corresponds to a contiguous range of input signals. For example, state 5 corresponds to the range of input signals $\geq 50$. When state 5 is detected the video signal coupled to input terminal V5 of the multiplier is passed as the output signal. When the video signal values fall within one of the ranges associated with states 1–4, the corresponding value (Value 1–Value 4) is passed as the output signal for that range. In this example the various ranges 1–4 may span equal or unequal numbers of input values, and thus may be arranged to generate any one of a family of amplitude mapping functions. One such function of interest is given by $$OUT = Q_i[x/a_i]$$

where $Q_i$ are respective output levels for respective ranges, $a_i$ represent respective ranges, and [] represents interger division.

Figure 8:
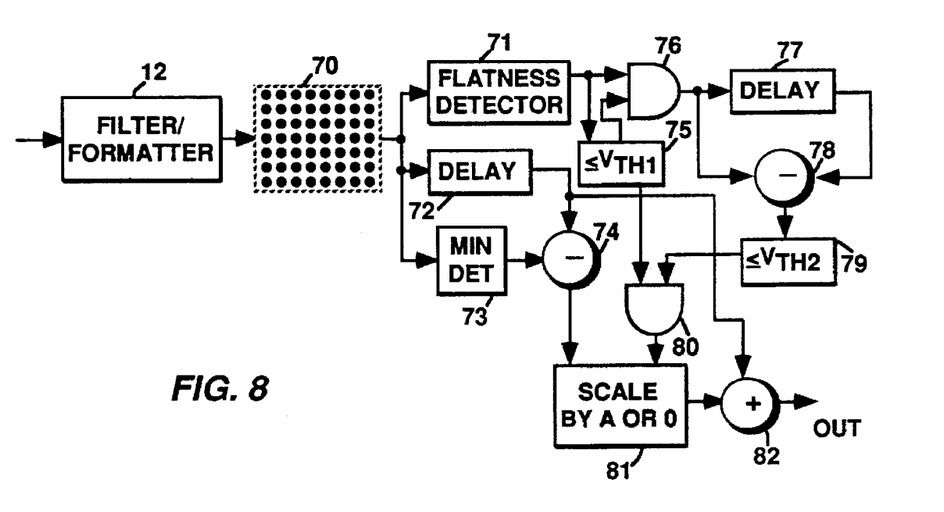

FIG. 8 illustrates a remapper which operates at other than darker image areas. That is the remapping function is performed at any flat field image area. In FIG. 8 element 70 does not necessarily represent an actual processing element, but is included to indicate the respective 8×8 matrices of blocks of pixels that are processed in the block by block processing. Pixel data in blocks of 8×8 pixels, is applied to a delay element 72, a minimum detector 73 which selects the smallest pixel value in respective blocks, and to a flatness detector 71. The flatness detector 71 in conjunction with a threshold detector 75, determines if respective blocks of pixel data represent flat field image areas. Detector 71 may take different forms. For example detector 71 may generate as an output value $D_{71}$, the standard deviation of the pixel values in respective blocks. Alternatively, detector 71 may generate as an output value $D_{71}$, a sum of differences according to a formula such as $$D_{71} = \sum_{block} (P_{i,j} - P_{min})$$

or;

$$D_{71} = \sqrt{\sum_{block} (P_{i,j} - P_{avg})^2}$$

where $P_{i,j}$ represent the various pixel values in a block and $P_{min}$ and $P_{avg}$ are the minimum and average pixel values in respective blocks.

If the sum $D_{71}$ is sufficiently small, the block is presumed to contain pixels with substantially equal amplitude values and to represent a flat field image area. Experimentally a threshold value is determined and incorporated in the threshold detector 75. When a respective block exhibits a value $D_{71}$ which is less than the threshold, the threshold detector 75 enables both AND gates 76 and 80, and disables them otherwise. When AND gate 76 is enabled the value $D_{71}$ for the current block is applied to a delay element 77 which stores the value of $D_{71}$ associated with the previous block. The values of $D_{71}$ for the current and previous block are compared in a subtractor 78, and this difference is applied to a second threshold circuit 79. If the difference of the values $D_{71}$ for successive blocks is less than the threshold associated with circuit 79, circuit 79 applies an enabling potential to the AND gate 80, and a disable signal otherwise. As will be made clear below, if both inputs to the AND gate 80 exhibit enabling signals, the small amplitude variations of otherwise flat field representative signal are selectively enhanced or peaked, but the average value of the signal is substantially unaltered. That is, if the current block represents a flat field image area, and the previous block represents a similarly characteristic flat field image area, the current field has low level variations enhanced.

Pixel values from the delay circuit 72 are applied to one input port of an adder 82, and are also applied to the minuend input of a subtractor 74. The minimum pixel value for the respective block is applied by the minimum detector 73 to the subtrahend input of the subtractor 74. The output values from the subtractor 74 are the variations from the minimum pixel value for the block, i.e., the low level variations. (Rather than using the minimum value in subtracter 74, the average value could just as well have been employed.) The low level variations are applied to a multiplier 81, wherein they are scaled by a factor A, or by zero. If both inputs to AND gate 80 exhibit enabling signals, the block of differences from subtracter 74 are scaled by A, otherwise they are scaled by zero. The scaled block of low level differences are applied to a second input port of the adder 82. If the scale factor for a block is zero, the values provided by the circuit 81 to the adder 82 are zero valued and the output of the adder 82 represents unaltered video signal. Alternatively, if the scale factor for a block is A, amplified low level signal variations are applied to adder 82 from the circuit 81, and adder 82 produces flat field image representative signal with enhanced low level signal variations, which will tend to preclude contouring.

A further alternative analog or digital mapping apparatus may take the form of a μlaw expander/compander.

The CCIR601 standard specifies a mapping correspondence between the digital representation of a video signal and its analog counterpart. According to this specification, discrete sample values of the luminance component of a video signal, in the range (16:235), maps linearly to an analog voltage between a minimum corresponding to "black" and a maximum corresponding to "white". Pixels with value 16 and below in the digital representation should therefore produce the same minimum "black" voltage, while values 235 and above should produce the same "white" peak voltage.

MPEG as a video compression standard uses CCIR601. Thus, luminance pixel values below 16 are disallowed, and should be changed to 16 somewhere in the processing chain of the system, before being applied to the D/A converter. Alternatively the D/A converter may be constructed in such a way that the same minimum "black" voltage is produced, for any input value at or below 16. In practice, however, strict adherence to CCIR601 is rarely enforced. Most D/A converters take the full range of input values between 0 and 255, and produces a linear output voltage. In some cases, instead of mapping [16,235] to the full voltage swing, [0,255] is mapped. In other cases, when given values outside the range [16,235], voltages outside the specified range are produced. A input value below 16 would therefore appear "blacker than black".

Figure 9:
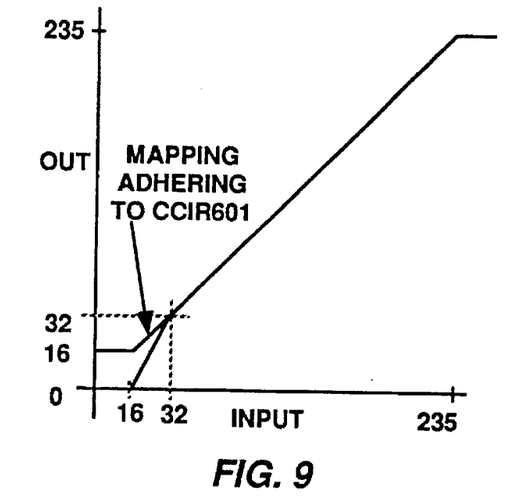
Figure 10:
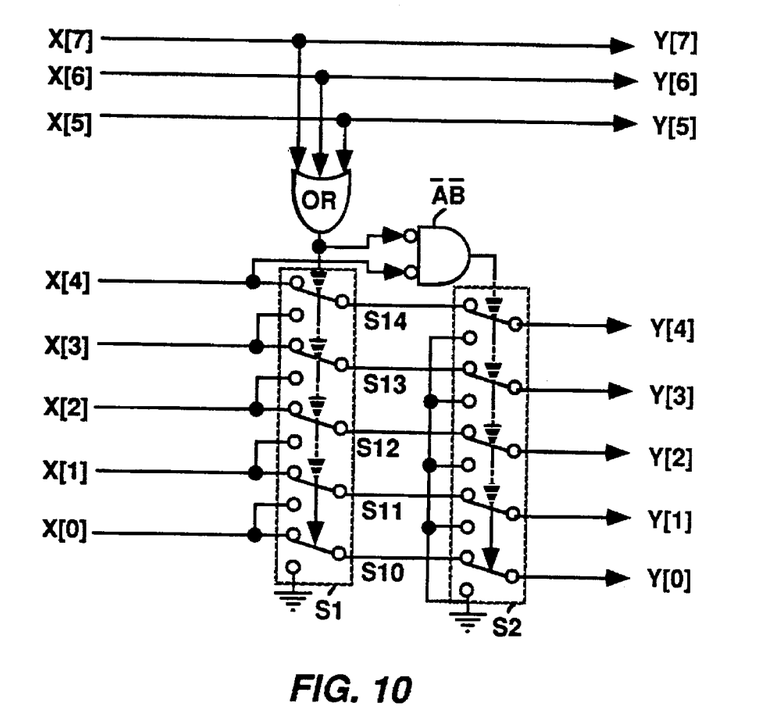

If one is permitted use of values below 16, a preferred and very simple, yet effective amplitude mapping for reducing contours can be realized according to the relationships given by:

if(X < 16)      Y = 0;
else if(X < 32) Y = α(X − 16)
else            Y = X;

where X and Y are input and output values respectively, and α is a constant. The mapping is illustrated in FIG. 9 with a value of α equal to 2. This function may realized in hardware using random logic and switches, for example as provided by the apparatus illustrated in FIG. 10. This circuitry effects a selective bit shift leftwards (towards more significant bit positions) of a group of the less significant bits, as a function of the value represented by the more significant bits. Denote respective input sample bits by x[i] and respective output sample bits by y[i], with i=0 . . . 7 for eight bit samples. Using Boolean algebra, let;

$$z = x[7] + x[6] + x[5]$$
$$y[0] = x[0]z$$
$$y[i] = x[i]z + x[i-1]x[4]z' \quad \text{for } i = 1 \ldots 4$$
$$y[i] = x[i] \quad \text{for } i = 5 \ldots 7$$

where z' is the complement of z. The function y[i]=x[i−1] x[4]z' represents a left shift of one bit of bits 1–4, for values of the input sample greater than 16 and less than 32. This one bit shift corresponds to an α value of two.

In FIG. 10, the function z is realized by the OR gate, and the function x[i]z+x[i−1]x[4]z' is realized by the OR gate in conjunction with a switch bank S1. The respective input bits for i=0, . . . 4 are coupled to a first switch bank S1. For sample input values greater than 32, the state of the switch bank S1 is as shown in the drawing. For values less than 32, the switches in bank S1 are in the opposite state. Thus for values greater than 32 respective switches Sli, of the switch bank S1, pass the corresponding bit value. On the other hand, if the sample values are less than 32, the respective switches Sli pass the bit of next lower significance and switch S10 passes a zero value. The output values provided by the switch bank are coupled to respective input connections of a second switch bank S2. The switch bank S2 provides the respective output values output by bank S1 unless the input values are less than 16, in which case bank S2 provides a zero value for all bits. This occurs when the output of the OR gate is low and bit x[4] exhibits a low state. This condition is sensed by the NOT AND gate. The state of the switch bank S2 that is illustrated in FIG. 10 is for the NOT AND gate exhibiting a low output level.

Figure 11:
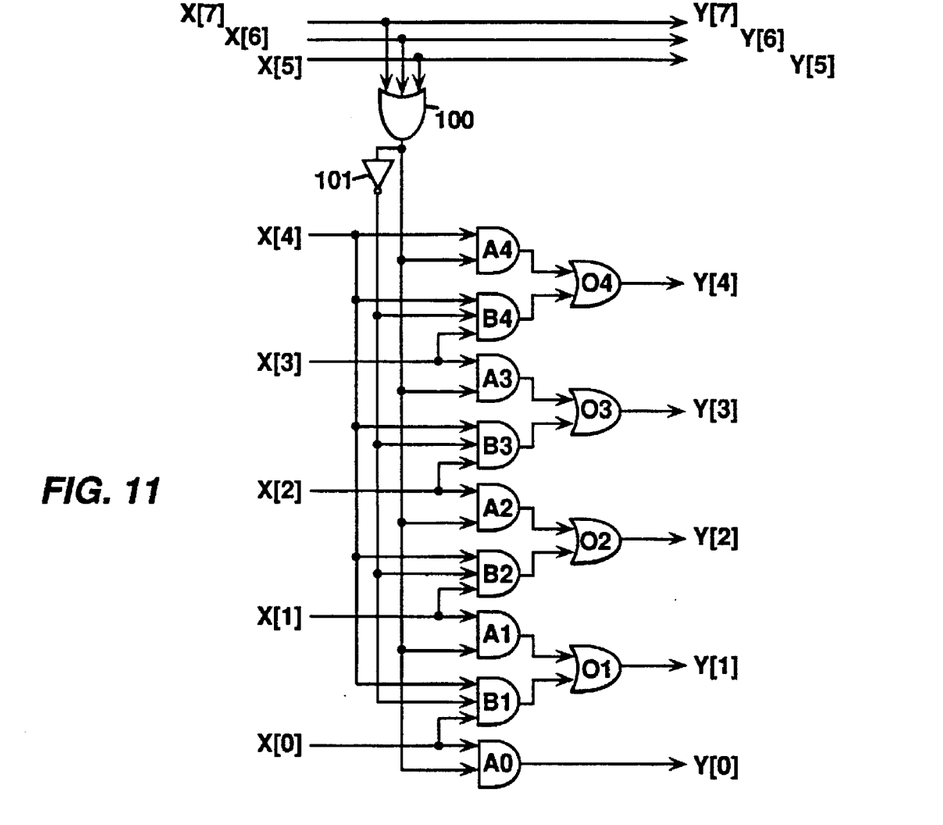

FIG. 11 illustrates a complete random logic realization of the function performed by the FIG. 10 circuitry. In FIG. 11, the function z is realized by the OR gate 100, and the function z' by the invertor 101. The respective bit values for i=1, . . . 4 are provided by the AND gates Ai for input values greater than or equal to 32 (the OR gate 100 exhibits a logic high), and by the AND gates Bi for input values less than 32 (the OR gate 100 exhibits a logic low and the inverter 101 exhibits a logic high and bit x[4] exhibits a logic high). The output values of the AND gates Ai and Bi for respective bits are non-additively combined in the respective OR gates Oi. A detailed description of this circuitry will not be provided as one skilled in the art of digital circuit design will readily comprehend its operation.

Figure 12:
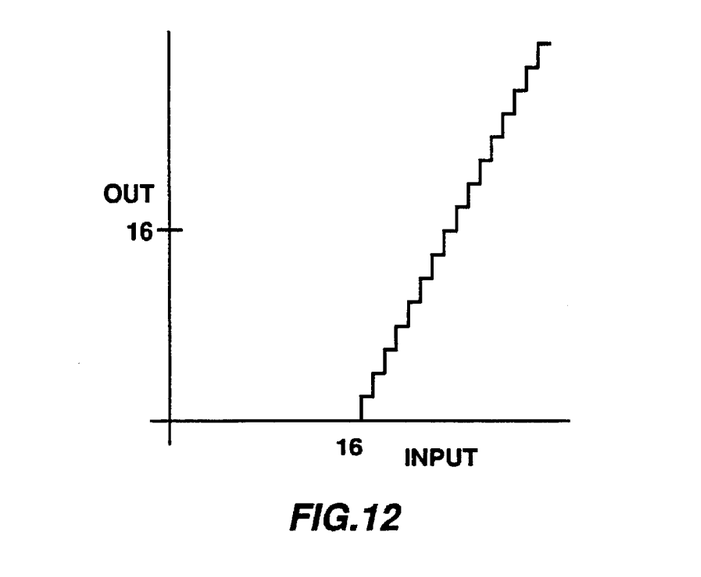

FIG. 12 illustrates, in expanded form, the output signal provided by the circuitry of FIG. 11, in the range of input values less than 32. The output signal is monotonic and has an average slope or gain of two. It is noted that the output values between 16 and 32 are in fact reduced from their actual values, (values 16–32 are mapped into values 0–32) but the gain, which is indicated as being greater than one is defined as dy/dx, i.e. the change in the output per unit change in input.

This particular mapping has the following advantages:
a) it is easy to implement, but yet effective in reducing contouring artifacts;
b) it has little visual side-effects and does not affect the overall brightness of normal images;
c) the mapping is one-to-one, and no information is lost in the process. If desired, one can perform an inverse mapping to recover the original pixel values exactly; and
d) it has very little effect on coding efficiency, even when applied to normal images which do not exhibit contouring.

What is claimed is:

1. In a video compression system a method for reducing contouring effects in reproduced decompressed flat field image areas comprising:
   providing a video signal to be compressed;
   detecting image areas of said video signal which have signal deviations less than a predetermined value;
   selectively amplifying detected said image areas of video signal which have signal deviations less than a predetermined value with a gain greater than image areas which have signal deviations greater than said predetermined value.

2. The method set forth in claim 1 wherein contour reduction is performed only on video signal representing relatively dark images and said step of selectively amplifying comprises amplifying video signal representing relatively dark images with a first gain function having gain values greater than one, and amplifying video signal representing relatively brighter images with a second gain function having gain values less than said first gain function.

3. The method set forth in claim 1 wherein the step of selectively amplifying comprises:
   providing a memory programmed at respective address locations with values corresponding to a first contiguous range of address values scaled by a first gain function and at least a second contiguous range of address values scaled by a second gain function; and
   applying said video signal to an address port of said memory.

4. The method set forth in claim 1 wherein said step of selectively amplifying comprises companding said video signal according to a μlaw characteristic in which smaller signal amplitudes tend to be amplified and larger signal amplitudes tend not to be amplified.

5. In a video compression system a method for reducing contouring effects in flat field image areas comprising:
   providing a video signal to be compressed;
   mapping a first range of video signal amplitude values to a first constant value;
   mapping a second range of video signal amplitude values to a second constant value;
   mapping a third range of video signal amplitude values to a third constant value;
   mapping a fourth range of video signal amplitude values into their equivalent values;
   wherein said first, second, third and fourth ranges represent successively larger video signal amplitude values, and said first, second and third constant values are successively larger values and said mapping amplifies relatively smaller signal amplitude variations more than relatively larger signal amplitude variations.

6. The method set forth in claim 5 wherein said second range is smaller than said first range, said third range is smaller than said second range and said fourth range is larger than said first, second and third ranges.

7. In a video signal compression system, apparatus for reducing contouring in reproduced images, comprising:

a source of said video signal;

means, coupled to said source, for selectively amplifying amplitude variations in flat field image areas of said video signal, with a greater gain function than video signal representing non flat field image areas or video signal representing bright image areas; and a video signal compressor coupled to said means, for compressing said video signal.

8. The apparatus set forth in claim 7 wherein said means comprises:

a memory having an address input port coupled to said source and a data output port coupled to said video signal compressor, said memory being programmed at address locations representing brighter image signal with a first address value-data value correspondence and at address locations representing darker image signal with a second address value-data value correspondence, said second correspondence representing a greater gain function than said first correspondence.

9. The apparatus set forth in claim 7 wherein said means comprises a memory having an address port coupled to said source and a data output port coupled to said video signal compressor, said memory being programmed over a first range of address locations representing darker image signal with a first constant value, over a second range of address locations representing less dark image signal with a second constant value, and over a third range of address values representing still lesser dark image signal with respective said address values, and wherein said second constant value is greater than said first constant value.

10. The apparatus set forth in claim 7 wherein said means is a µlaw compander.

11. The apparatus set forth in claim 7 wherein said means amplifies dark images representative of video signal with a gain greater than one and brighter image representative video signal with a gain less than one.

12. The apparatus set forth in claim 7 wherein said video signal is in sampled digital format, and said means comprises logic circuitry for selectively shifting lesser significant bits of input video signal samples to more significant bit positions.

13. The apparatus set forth in claim 12 wherein said logic circuitry includes a means responsive to the more significant bits of said input video signal samples for generating a control signal to condition said logic circuitry for selectively shifting lesser significant bits of input video signal samples to more significant bit positions for input video signal samples that exhibit values in excess of a predetermined value.

14. The apparatus set forth in claim 12 wherein said logic circuitry includes means responsive to the more significant bits of said input video signal samples, for passing said lesser significant bits of input video signal samples to corresponding bit positions of an output port, for input samples exhibiting values in excess of a predetermined value, and for passing said lesser significant bits of input video signal samples to respective bit positions of one-bit greater significance of said output port, for input video signal samples which exhibit values less than said predetermined value.

15. The apparatus set forth in claim 7 further comprising:

a detector for detecting contiguous image areas having signal variations less than a predetermined value, and for conditioning said means to amplify video signal representing detected said contiguous areas with a larger gain function than video signal representing non detected image areas.

16. In a video signal compression system, apparatus for reducing contouring in reproduced images, comprising:

a source of said video signal;

a video signal compressor an amplifier having an input terminal coupled to said source, an output terminal coupled to said video signal compressor, and having non-linear feedback circuitry coupled between its input and output terminals to effect greater amplification for dark image representative video signal than bright image representative video signal.

* * * * *